United States Patent [19]

Furukawa et al.

[11] Patent Number: 5,685,803

[45] Date of Patent: Nov. 11, 1997

[54] HYDRAULIC PRESSURE CONTROL SYSTEM FOR HYDRAULICALLY OPERATED VEHICLE TRANSMISSION

[75] Inventors: Hideo Furukawa; Tatsuyuki Ohashi, both of Wako, Japan

[73] Assignee: Honda Giken Kogyo Kabushiki Kaisha, Tokyo, Japan

[21] Appl. No.: 610,061

[22] Filed: Feb. 29, 1996

[30] Foreign Application Priority Data

Mar. 2, 1995 [JP] Japan .................................. 7-068752

[51] Int. Cl.$^6$ .................................................. F16H 61/04
[52] U.S. Cl. ........................... 477/158; 477/162; 477/156
[58] Field of Search ............................. 477/156, 158, 477/162, 163

[56] References Cited

U.S. PATENT DOCUMENTS

| | | | |
|---|---|---|---|
| 5,449,330 | 9/1995 | Paulsen | 477/156 X |
| 5,612,874 | 3/1997 | Schulz et al. | 477/163 X |

FOREIGN PATENT DOCUMENTS

| | | |
|---|---|---|
| 54-103940 | 8/1979 | Japan . |
| 58-24654 | 5/1983 | Japan . |
| 58-26254 | 6/1983 | Japan . |
| 60-227048 | 11/1985 | Japan . |
| 60-231056 | 11/1985 | Japan . |

*Primary Examiner*—Charles A. Marmor
*Assistant Examiner*—Nathan O. Jensen
*Attorney, Agent, or Firm*—Armstrong, Westerman, Hattori, McLeland & Naughton

[57] ABSTRACT

A vehicle automatic transmission control system, in which when a gear to be shifted to is determined in response to the throttle opening and vehicle speed, hydraulic oil is supplied to a clutch for the gear to be shifted to. In an early period of the gearshift, the hydraulic oil is supplied to decrease a time lag between an output of the gearshift command and a start of clutch engagement. In the system, there is provided, instead of an expensive oil pressure sensor, a means for estimating or detecting the clutch oil pressure as a capacity of power which the clutch can transmit. When the estimated or detected pressure is high, the supply of oil to the clutch is prohibited so as to prevent sudden clutch engagement which would otherwise produce shock.

7 Claims, 10 Drawing Sheets

Gearshift — 2nd, 3rd, 4th

FIG. 7B

1st — TM1STC

FIG. 7C

2nd — TM2ndC

FIG. 7D

3rd — YTCLON, TM3rdC

FIG. 7E

4th — TM4THC

HYDRAULIC PRESSURE CONTROL SYSTEM FOR HYDRAULICALLY OPERATED VEHICLE TRANSMISSION

BACKGROUND OF THE INVENTION

1. Field of the Invention

This invention relates to a hydraulic pressure control system for a hydraulically operated vehicle transmission, more particularly to such a hydraulic pressure control system which determines the supply of charging hydraulic (oil) pressure to a clutch at the time of engagement after first discriminating, without use of an oil pressure sensor, whether or not control of oil pressure for clutch charging is necessary.

2. Description of the Prior Art

In a hydraulically operated vehicle automatic transmission which is equipped with multiple frictional engaging elements such as hydraulic (oil) clutches, brakes and the like that are engaged by the supply of (operating) oil and which shifts gears by supplying/discharging operating oil to/from the frictional engaging elements, it is necessary to prevent gearshift shock by optimizing the oil pressure for clutch engagement.

Ordinarily, the engagement of a clutch starts after a shift valve has switched in response to a gearshift command, oil has been supplied to the clutch piston chamber (cylinder) from the oil pressure source, and the piston stroke has begun following the charging of the piston chamber with the oil. As a result, the piston stroke starts only after a time lag.

When the clutch disengages, moreover, the clutch rotation produces a centrifugal force which acts on the oil remaining in the piston chamber. This gives rise to a centrifugal oil pressure that produces a slight piston stroke and the clutch is therefore put in weak engagement. When the piston chamber of a clutch is provided with a check valve for discharging the centrifugal oil pressure so as to solve the problem, since a certain amount of time is required for the check valve to close at the time of clutch engagement, this period also adds to the time lag.

As taught by Japanese Laid-Open Patent Application Nos. Sho 60(1985)-227048 and Sho 60(1985)-231056, the time lag can be shortened by controlling a solenoid valve (a linear or duty solenoid valve) so as to effect rapid charging by, for example, supplying high pressure oil for a prescribed time period.

With this prior art, however, oil pressure supplying is conducted during clutch engagement without giving any consideration to the clutch state before the supplying. In other words, no consideration is given to such matters as whether the piston chamber is empty of oil or whether it is almost completely full with residual oil because only a short time has passed after disengagement.

While oil pressure for charging (which will be called "response pressure" in the sense that it is an oil pressure which increases the response of the oil pressure control) is required in the former of the aforesaid cases, it is not only unnecessary but should not be supplied in the latter case because it is likely to cause sudden clutch engagement and produce shock. In the latter case, therefore, it is preferable not to supply response pressure but to supply only the ensuing control oil pressure, for example, to supply only control oil pressure determined according to prescribed characteristics based on, for example, change in the rotation of the transmission input shaft or the like.

SUMMARY OF THE INVENTION

An object of this invention is therefore to overcome the aforesaid problems of the prior art by providing a hydraulic pressure control system for a hydraulically operated vehicle transmission which detects the state of a clutch or other such frictional engagement element and discriminates whether or not to supply response pressure based on the result of the detection.

While the detection of the state of the clutch or other such frictional engagement element can be conducted by detecting the actual engaging oil pressure, this is undesirable in terms of cost because it requires use of an oil pressure sensor.

Another object of the invention is therefore to provide a hydraulic pressure control system for a hydraulically operated transmission which detects the state of a clutch or other such frictional engagement element without use of an oil pressure sensor and discriminates whether or not to supply response pressure based on the result of the detection.

This invention achieves this object by providing a system for controlling hydraulic pressure of a hydraulically operated vehicle transmission, comprising vehicle operating condition detecting means for detecting parameters indicative of operating conditions of the vehicle, gearshift command output means for determining a gear ratio to be shifted to based on the detected parameters, to output a gearshift command, a plurality of frictional engaging elements for selectively establishing one gear stage in the transmission, and hydraulic pressure regulating means for regulating a supply of hydraulic pressure to at least one of said frictional engaging elements in response to the gearshift command, such that the determined gear ratio is established to transmit engine power to a vehicle wheel, said hydraulic pressure regulating means regulating the supply of hydraulic pressure to the at least one of said frictional engaging elements to decrease a time lag between an output of the gearshift command and a start of engagement of the frictional engaging element. In the system, said hydraulic pressure regulating means includes power transmission capacity detecting means for detecting a capacity of power transmitted from an input side to an output side of the frictional engaging element, and control means for controlling operation of said hydraulic pressure regulating means in response to the detected capacity of power detected by said power transmission capacity detecting means.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
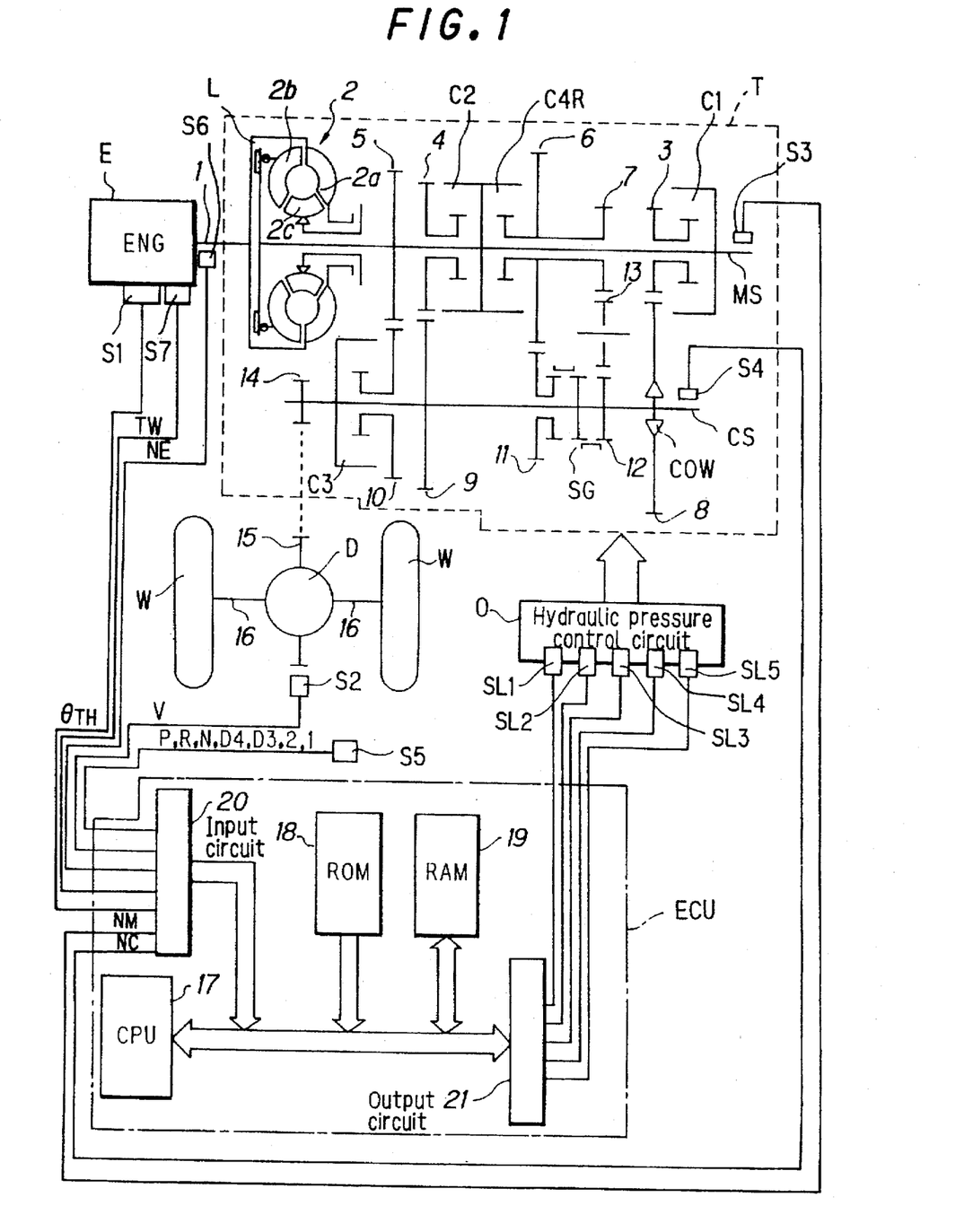
FIG. 1 is an overall view of a hydraulic pressure control system for a hydraulically operated vehicle transmission.

FIG. 1 is an overall view of the hydraulic pressure control system for a hydraulically operated vehicle transmission according to the invention.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear (gear ratio or gear stage) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R. The clutches C1, C2, C3 and C4R are the aforesaid frictional engaging elements.

The rotation of the countershaft CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle valve (not shown) for detecting the degree of opening or position θTH of the throttle valve. A vehicle speed sensor S2 for detecting the vehicle traveling speed V from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed NC of the transmission output shaft from the rotation of the countershaft CS.

A shift lever position sensor S5 is provided in the vicinity of a shift lever (not shown) installed on the vehicle floor near the driver's seat. The shift lever position sensor S5 detects which of the seven positions P, R, N, D4, D3, 2, and 1 has been selected by the driver. A crank angle sensor S6 is provided in the vicinity of the crankshaft 1 of the engine E for detecting the engine speed NE from the rotation of the crankshaft 1, and a coolant temperature sensor S7 for detecting the engine coolant temperature TW is provided at an appropriate location on a cylinder block (not shown) of the engine E. Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1, etc., are input to the microcomputer through the input circuit 20. The CPU 17 of the microcomputer determines the gear (gear ratio) and energizes/deenergizes shift solenoids SL1, SL2 of a hydraulic (pressure) control circuit O via the output circuit 21 so as to switch shift valves (not shown) and thereby engage/disengage the hydraulic clutches of prescribed gears, and controls the operation of the lockup clutch L of the torque converter 2 via control solenoids SL3 and SL4. The CPU 17 also controls the clutch hydraulic pressure through a linear solenoid SL5, as will be explained later.

Figure 2:
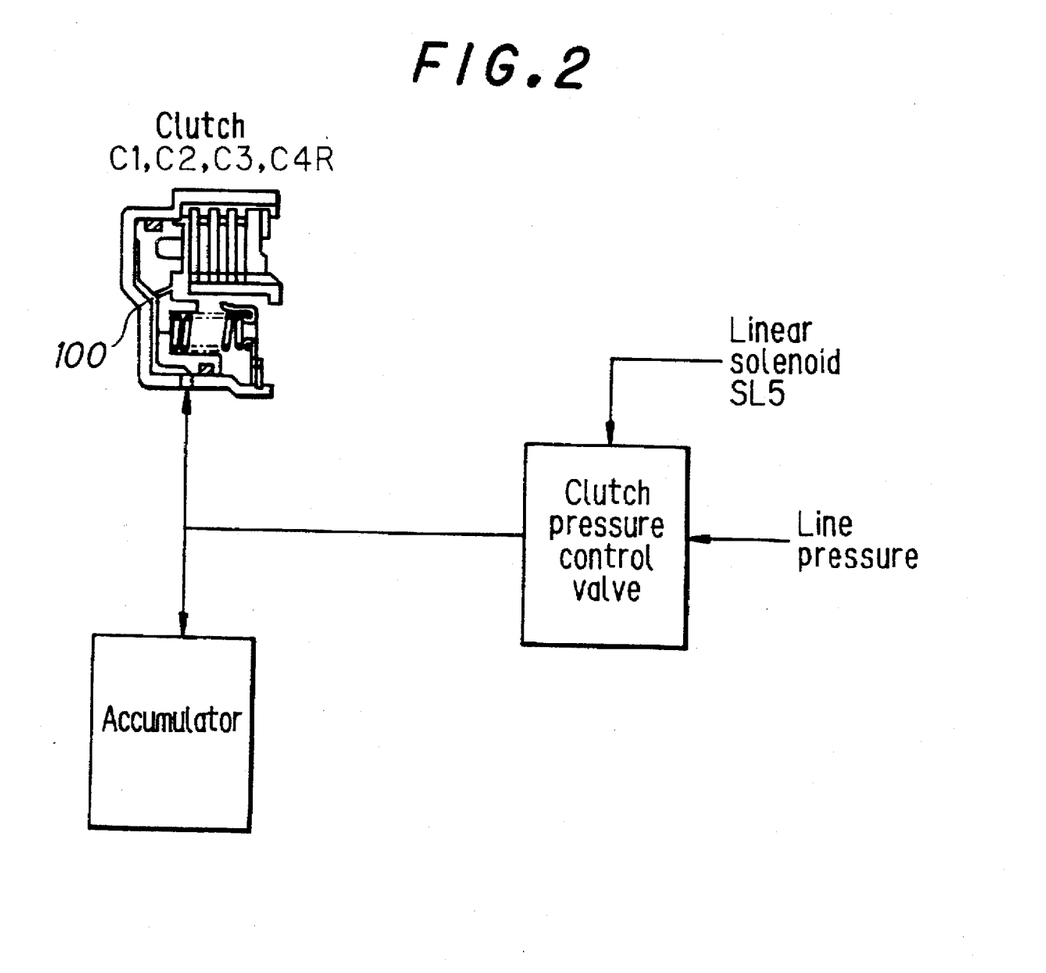
FIG. 2 is an explanatory view showing a part of the hydraulic control circuit of the system illustrated in FIG. 1.

FIG. 2 is an explanatory view showing a part of the hydraulic (pressure) control circuit 0 of the system of FIG. 1. Line pressure (primary pressure) supplied from a hydraulic pressure source (not shown) is sent to a clutch pressure control valve. The clutch pressure control valve regulates, with the aid of the aforesaid linear solenoid SL5, the line pressure within a prescribed throttle pressure range and supplies it to the clutches C1, C2, C3 and C4R. An accumulator is provided in the path to absorb surge pressure.

Thus, in this embodiment, the CPU 17 regulates the line pressure by using the linear solenoid SL5 to control the clutch pressure control valve so that, as explained later, the pressures supplied to the clutches are controlled to the desired value. As shown in FIG. 2, each of the clutches C1, C2, C3 and C4R is provided with a hole 100 for discharge of centrifugal hydraulic pressure. Centrifugal pressure is discharged at the time of clutch release, through a check valve (not shown) such as that disclosed in Japanese Patent Publication No. Sho 58(1983)26254.

Figure 3:
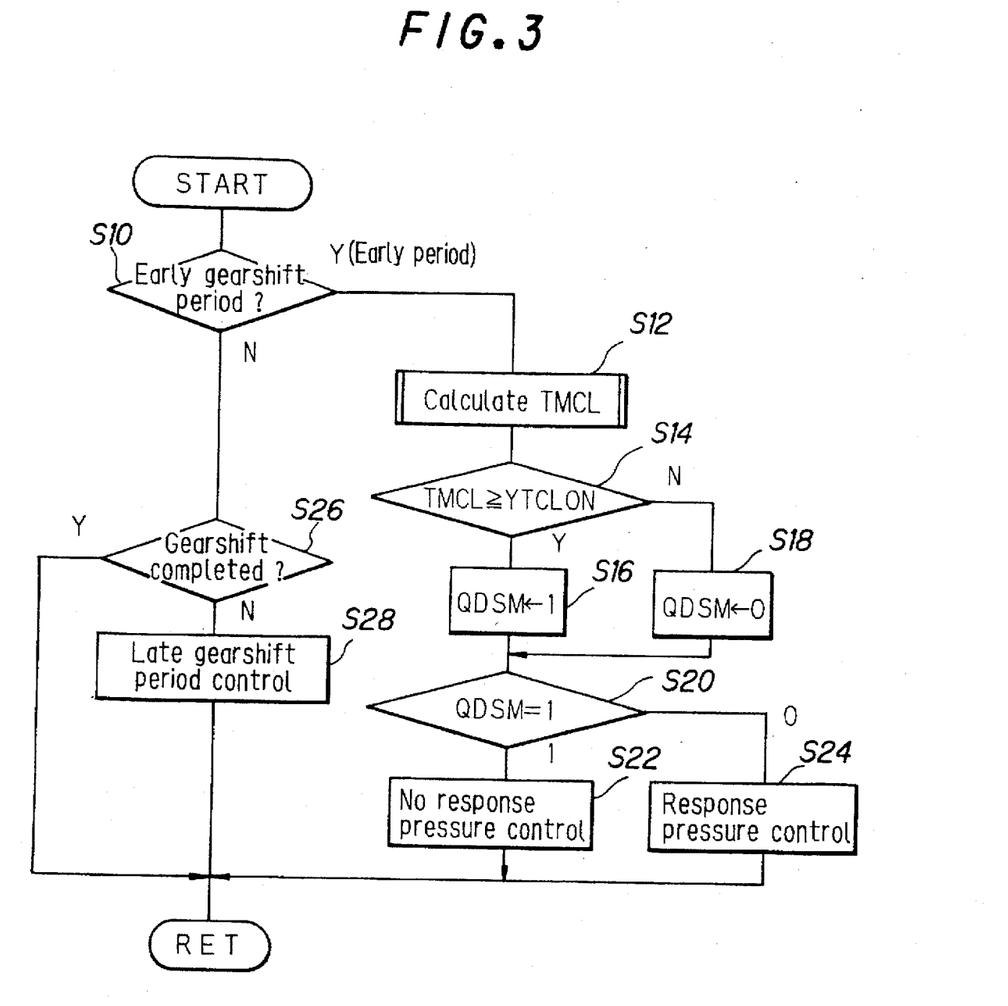
FIG. 3 is a flowchart showing the operation of the system illustrated in FIG. 1.

FIG. 3 is a main routine flowchart showing the operation of the hydraulic pressure control system according to the invention. The explanation of this figure will, however, be preceded by an explanation with reference to FIGS. 4 to 7.

Figure 4:
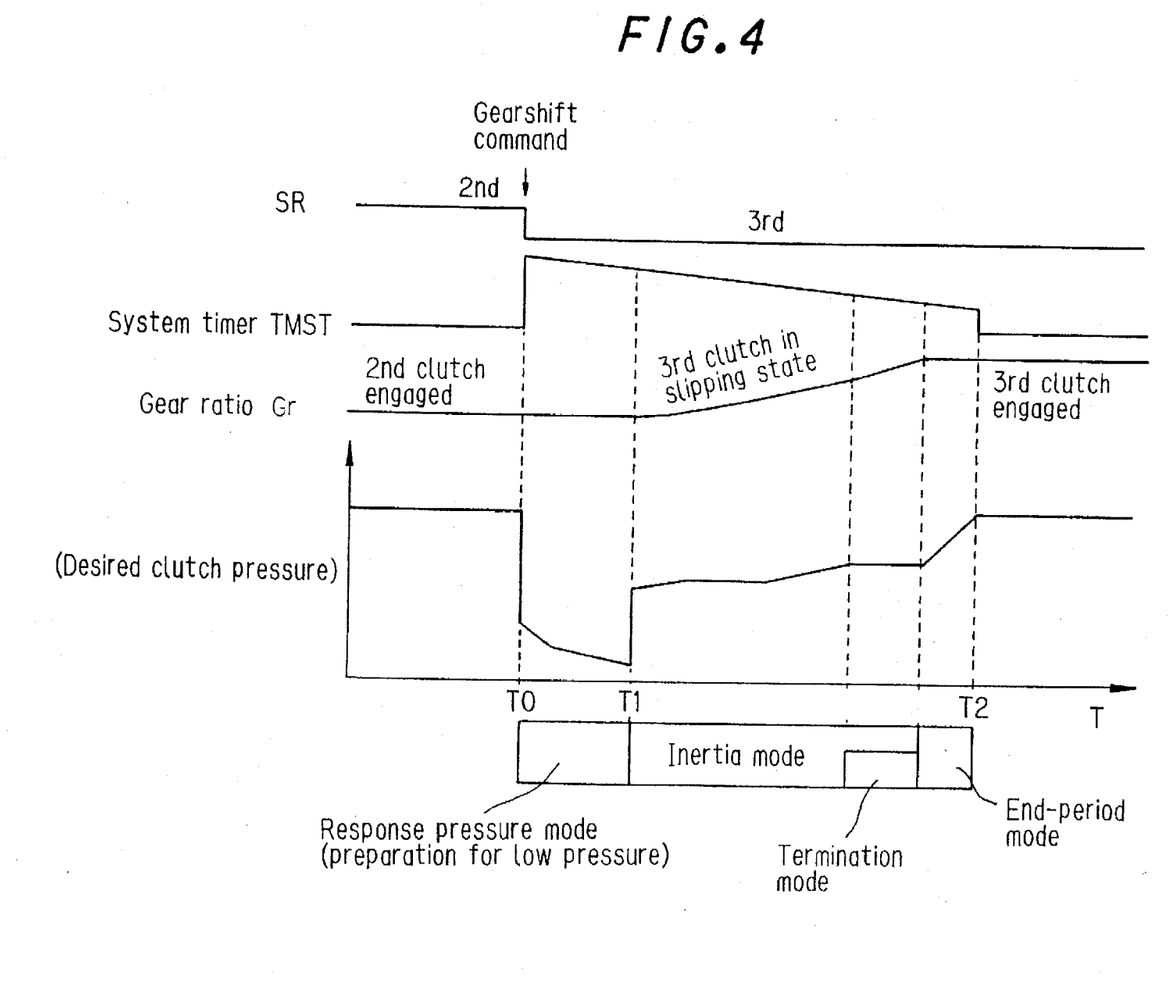
FIG. 4 is a timing chart explaining the procedures illustrated in the flowchart of FIG. 3.
Figure 5:
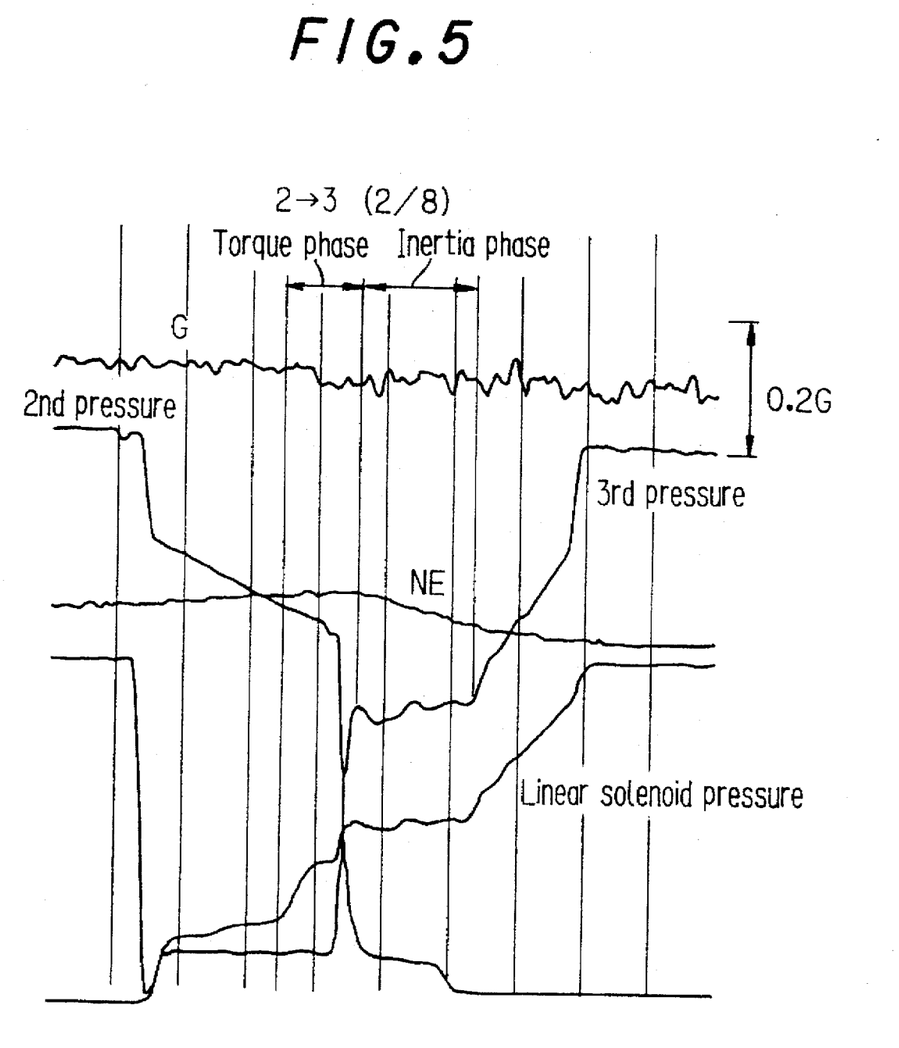
FIG. 5 is a graph showing simulation data for the case of conducting hydraulic pressure control in accordance with a desired clutch pressure shown in FIG. 4.

FIG. 4 is a timing chart taking the case of shifting up from second gear to third gear as an example. FIG. 5 is a graph which shows simulation data for the case of conducting oil pressure control in accordance with the desired clutch pressure shown at the bottom of FIG. 4. As shown at the top of FIG. 5, the transmission output shaft torque G (in the direction of vehicle travel) is nearly constant and no shock arises.

The desired clutch pressure curve at the bottom of FIG. 4 is established so that the supply of oil pressure to the second-speed clutch C2 is discontinued and the supply of oil pressure to the third-speed clutch C3 is started when the gearshift command SR is issued or output at the time point T0. Between time T0 and time T1, charging oil pressure (the aforesaid response pressure) is supplied to the third-speed clutch C3. In this specification, the period T0–T1 (torque phase period) is called the "early gearshift period" and the period between T1–T2 is called the "late gearshift period." The clutch pressure thus means engine power transmission capacity or the capacity of engine power which the clutch causes to a gear concerned to transmit.

Figure 6:
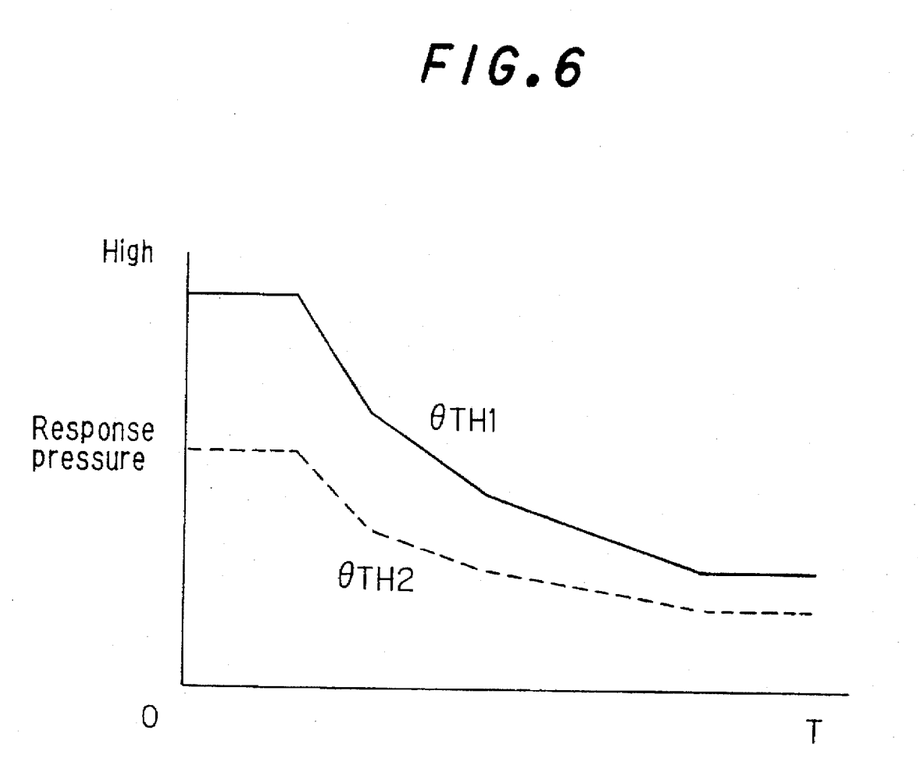
FIG. 6 is a graph showing the characteristics of response pressure supply referred to the in the flowchart of FIG. 3.
Figure 7A:
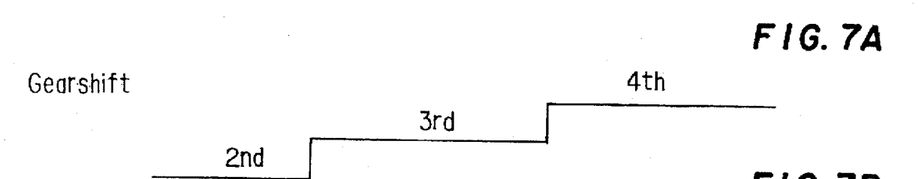
FIG. 7 is a timing chart showing the operation of a time counter referred to in the flowchart of FIG. 3.
Figure 7B:
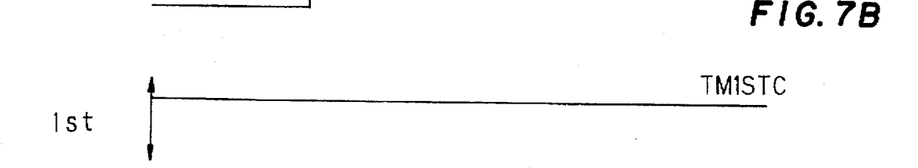
Figure 7C:
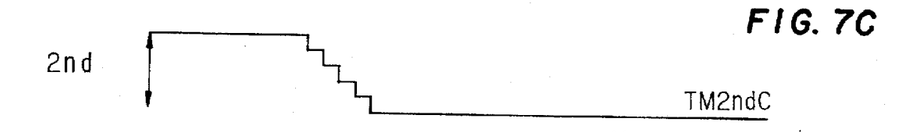
Figure 7D:
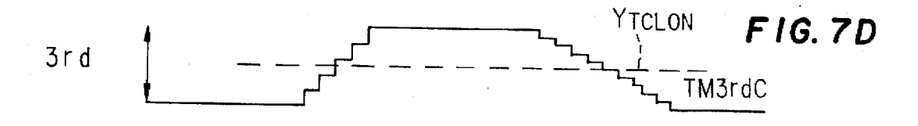
Figure 7E:
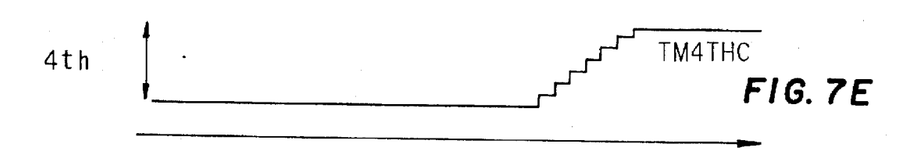

FIG. 6 is a graph showing the characteristics of response pressure supply. As shown, the supplied pressure is set to be high at first and then decrease with the passage of time. The high response pressure at the beginning is for reducing the aforesaid time lag by taking up the play of the piston stroke. If the supply of high pressure is continued, however, the stroke of the engaging clutch starts before the time T1, so that the period during which the engaging clutch and the disengaging clutch are both engaged is prolonged and gearshift shock occurs. The response pressure is therefore reduced with the passage of time during the early gearshift period to the minimum level sufficient to take up the piston stroke play.

Moreover, since the clutch control pressure is basically set for each clutch (each gear) as a function of the throttle opening (degree) θTH, the response pressure is also set as a function of the throttle opening at the time concerned, so as to supply higher response pressure at a high throttle opening θTH1 than at a low throttle opening θTH2.

Because of the high cost of an oil pressure sensor, the oil pressure control system of this embodiment configured in the foregoing manner utilizes a time counter instead.

This is possible because the clutch oil pressure can be assumed to increase at a constant rate if the clutch is supplied with oil at a constant rate. Specifically, the system is provided with a time counter which, as shown in FIG. 7, is incremented at regular intervals (equal to the activation period of the routine according to the flowchart of FIG. 3) so long as the same gear (gear ratio) is maintained and is decremented at regular intervals after gearshift. In addition, as also shown in the figure, an appropriate threshold value YTCLON is set above which the supply of response pressure is determined to be unnecessary. (To simplify the drawing, only the threshold value YTCLON relating to the time counter value (TM3rdC) for the third-speed clutch is shown.)

The operation of the system will now be explained with reference to the flowchart of FIG. 3. This program is activated once every 20 ms.

First, in S10, it is discriminated from the value of a system timer (shown in the timing chart of FIG. 4) whether or not the gearshift operation is in the early gearshift period, namely, whether or not it is between times T0 and T1 in the same timing chart. When the result in S10 is YES, the program goes to S12, in which the value of a time counter TMCL is calculated (explained later).

The program then advances to S14, in which it is checked whether the value of the time counter TMCL is equal to or greater than the threshold value YTCLON, and when it is, to S16, in which the bit of a flag QDSM is set to 1, and when it is not, to S18, in which the bit of the flag QDSM is set to 0.

Next, the flag bit is checked in S20. When it is 1, the program goes to S22 and no control of the response pressure is conducted (supply of response pressure is discontinued or prohibited) to prevent sudden clutch engagement which would otherwise produce shock. When it is 0, the program goes to S24 and control of the response pressure is conducted or executed (response pressure is supplied in accordance with the characteristics of FIG. 4 and 6).

When S10 finds that the gearshift operation is not in the early gearshift period, the program goes to S26, in which it is checked whether the gearshift has been completed. (The gearshift is judged to be completed when the value of the system timer shows that it is later than time T2 in the timing chart of FIG. 4.) When the result in S26 is YES, the program is immediately terminated, and when it is NO, the program goes to S28, in which late gearshift period control is conducted.

The late gearshift period control comprises an inertia mode for controlling the clutch oil pressure so as to obtain the desired change in the rotation of the main shaft MS during the inertia phase, an end-period mode for controlling the oil pressure to increase smoothly immediately before gearshift termination, and a termination mode near the end of the gearshift for increasing the oil pressure to that output in accordance with the throttle opening before and after gearshift when no gearshift is in progress. Since the invention is not directed to this point, however, it will not be explained in detail here.

Figure 8:
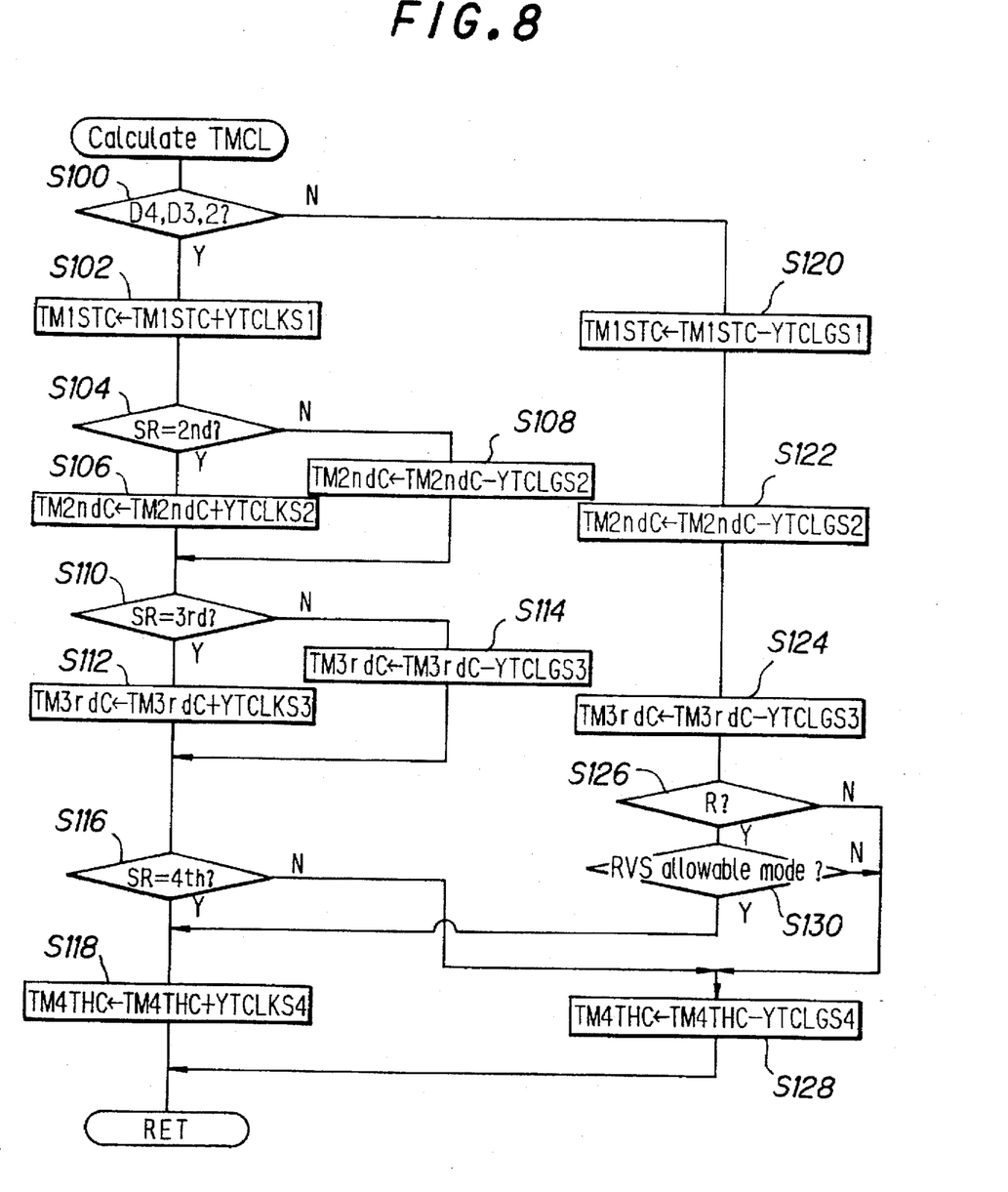
FIG. 8 is a flowchart showing a subroutine of a calculation of time counter value referred to in the flowchart of FIG. 3.

FIG. 8 is a flowchart of a subroutine for the calculation of the value of the time counter TMCL in S12 of the flowchart of FIG. 3. In FIG. 8 and later figures, the time counters TMCL for the first-, second-, third- and fourth-speed clutches C1, C2, C3 and C4R are referred to separately as TM1STC, TM2ndC, TM3rdC and TM4THC.

First, in S100, it is checked whether the detected range is D4, D3 or 2. When the result in S100 is YES, the program goes to S102, in which a prescribed value YTCLKS1 is added to the value of the first-speed clutch time counter TM1STC. As explained later, an overflow check and a limit check are conducted simultaneously with S102.

The program then goes to S104, in which it is checked whether the current gear (gear ratio) SR (gearshift command value SR in the timing chart of FIG. 4) is second gear. When the result in S104 is YES, the program goes to S106, in which a prescribed value YTCLKS2 is added to the value of the second-speed clutch time counter TM2ndC (and an overflow check and a limit check explained later are conducted simultaneously). When it is NO, the program goes to S108, in which a prescribed value YTCLGS2 is subtracted from the value of the second-speed clutch time counter TM2ndC (and an underflow check and a limit check explained later are conducted simultaneously).

The program then advances to S110, in which it is checked whether the current gear SR is third gear. When the result in S110 is YES, the program goes to S112, in which a prescribed value YTCLKS3 is added to the value of the third-speed clutch time counter TM3rdC (and an overflow check and a limit check explained later are conducted simultaneously). When it is NO, the program goes to S114, in which a prescribed value YTCLGS3 is subtracted from the value of the third clutch time counter TM3rdC (and an underflow check and a limit check explained later are conducted simultaneously).

The program then advances to S116, in which it is checked whether the current gear SR is fourth gear. When the result in S116 is YES, the program goes to S118, in which a prescribed value YTCLKS4 is added to the value of the fourth-speed clutch time counter TM4THC. The subtraction from the value of the fourth-speed clutch time counter TM4THC is described later.

Referring to FIG. 7, take as an example the case of the third-speed clutch time counter during a shift from second gear to third gear and then to fourth gear. The value of the third-speed clutch time counter is incremented by a prescribed amount once every program cycle starting from the time point at which the command to shift to third gear is issued or output and is then decremented by a prescribed amount once every program cycle starting from the time point at which the command is changed to one for shifting to fourth gear. In other words, the inventors assumed that the oil pressure of a clutch could be estimated from the elapsed time insofar as the rate of supply of oil to the clutch was constant.

A prescribed amount is added to the value of the first-speed clutch time counter TM1STC in S102 irrespective of whether or not the current gear is first gear. This is because in this embodiment the first gear is equipped with the one-way clutch and is therefore constantly engaged in the forward gear range.

On the other hand, when the result in S100 is NO, the program goes to S120, in which a prescribed value YTCLGS1 is subtracted from the value of the first-speed clutch time counter TM1STC (and an underflow check and a limit check explained later are conducted simultaneously), whereafter it progresses through S122 and S124, in which the prescribed values YTCLGS2,3 are subtracted from the values of the second-and third-speed clutch time counters TM2ndC, TM3rdC, respectively.

The program then advances to S126, in which it is checked whether the detected range is R (reverse gear range). When the result in S126 is NO, this means that the detected range is P or N and not a driving range, and the program goes to S128, in which a prescribed value YTCLGS4 is subtracted from the value of the fourth-speed clutch time counter TM4THC (and an underflow check and a limit check explained later are conducted simultaneously).

When the result in S126 is YES, the program goes to S130, in which it is checked whether the transmission is in RVS (reverse) driving allowable mode. When the result is NO, the program goes to S128, in which the prescribed value YTCLGS4 is subtracted from the value of the fourth-speed clutch time counter TM4THC, since vehicle backing is not allowed. When it is YES, the program goes to S118, in which the prescribed value YTCLKS4 is added to the value of the fourth-speed clutch time counter TM4THC. These steps are conducted because the fourth-speed clutch C4R is also used in reverse driving.

On the other hand, when the result in S116 is NO, the program proceeds to S128, explained previously, and then this routine is ended.

Figure 9:
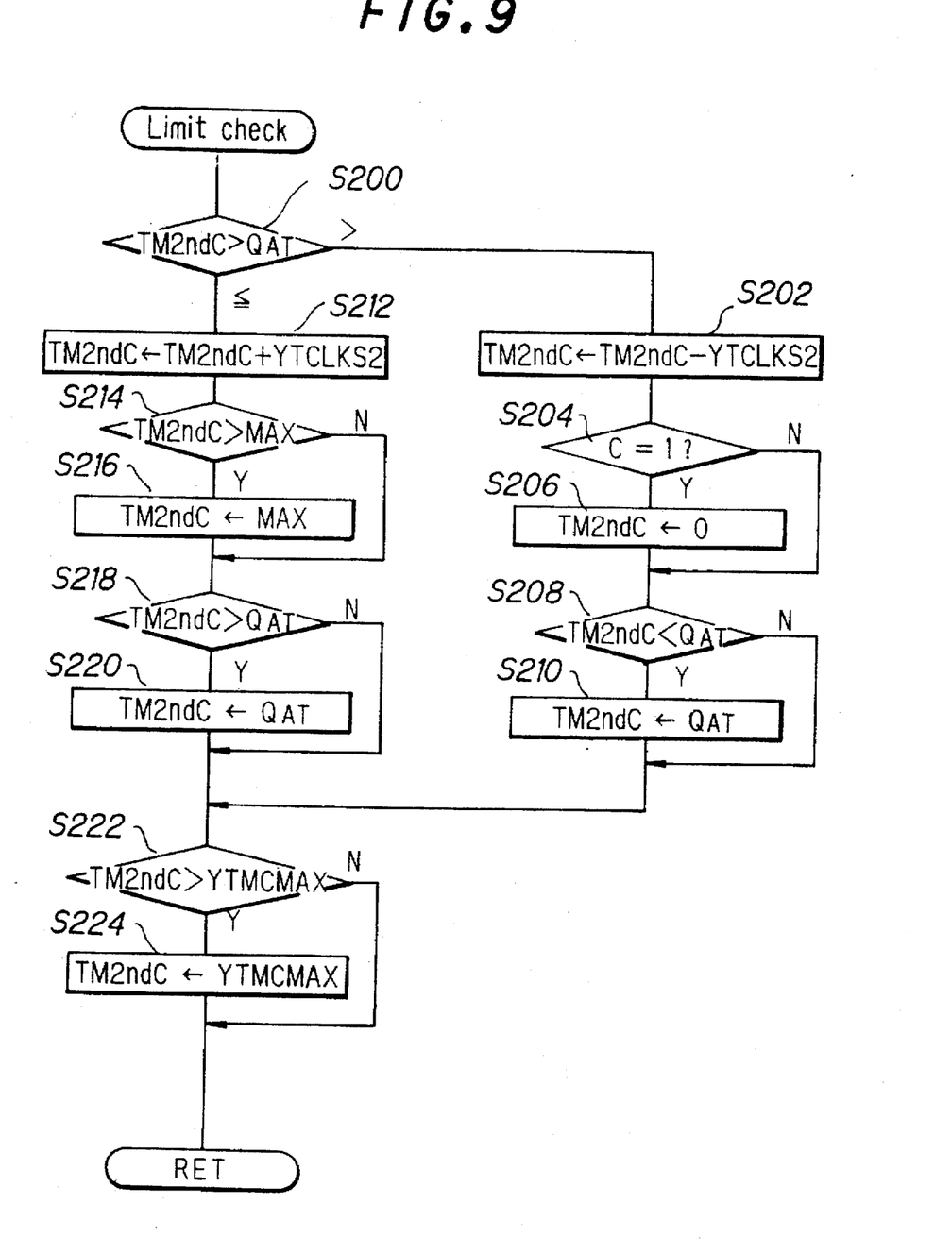
FIG. 9 is a flowchart showing a subroutine of the procedures referred to in the flowchart of FIG. 8.

FIG. 9 is a flowchart of a subroutine for the addition and subtraction of prescribed values in S102, S106, etc., of the flowchart of FIG. 8, including the aforesaid overflow (underflow) checks and limit checks. (While the flowchart of FIG. 9 is for processing the value of the time counter for the second-speed clutch C2, the same procedures also apply to the values of the other time counters.)

First, in S200, it is checked whether the value of the second-speed clutch time counter TM2ndC exceeds a prescribed value QAT. The prescribed value QAT indicates an oil pressure value corresponding to the value of the current being supplied to the linear solenoid SL5 (corresponding to the solenoid stroke amount) at that time.

Figure 10:
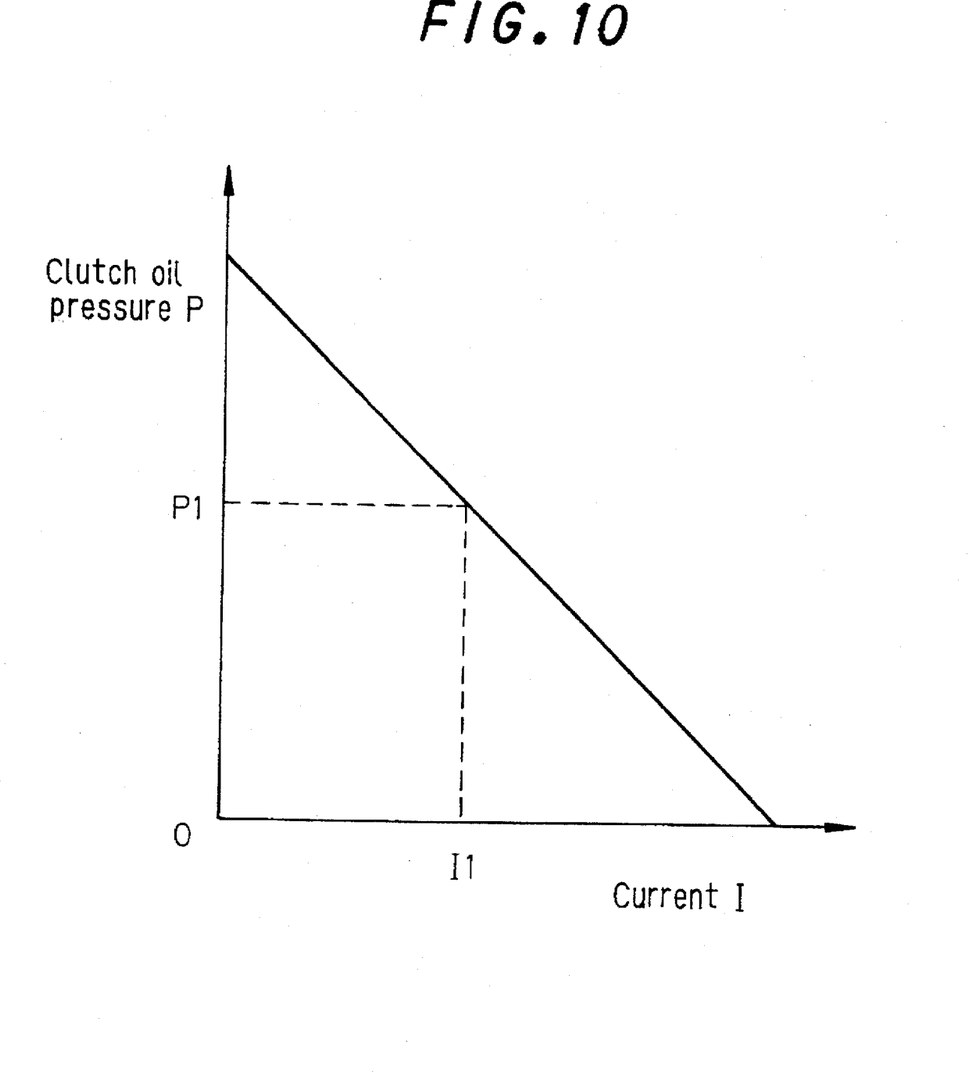
FIG. 10 is a graph showing the relationship between linear solenoid current and oil pressure referred to in the flowchart of FIG. 9.

Thus, when the relationship between the linear solenoid SL5 current and oil pressure is defined as shown by the characteristics of FIG. 10, the procedures of the first part of the flowchart of FIG. 9 amount to bringing the value of the second-speed clutch time counter TM2ndC to the current value I being output to the linear solenoid SL5 at that time, more specifically to the value equivalent to the clutch oil pressure P1 corresponding to the current value I1 at that time.

When S200 finds that the value of the second-speed clutch time counter TM2ndC exceeds the prescribed value QAT, since an oil pressure exceeding the linear solenoid output pressure cannot be expected, the program goes to S202, in which the prescribed value YTCLKS2 is subtracted from the value of the second-speed clutch time counter TM2ndC, and then to S204, in which it is checked whether the value of TM2ndC was made negative by the subtraction (C indicates negative in S204).

It is not possible for the clutch oil charging pressure to be negative and, therefore, when the result in S204 is YES, the program goes to S206, in which the calculated value of TM2ndC is set to 0. When the result is NO, S206 is skipped.

The program then advances to S208, in which the value of the second-speed clutch time counter TM2ndC is again compared with the prescribed value QAT. When the calculated value is less than QAT, since the purpose of the processing of S200 and S202 is to bring the value of the second-speed clutch time counter TM2ndC to QAT, not to a value less than QAT, the program goes to S210, in which the value of the second-speed clutch time counter TM2ndC is set to the value of QAT.

On the other hand, when S200 finds that the value of the time counter TM2ndC does not exceed the prescribed value QAT, the program goes to S212, in which the prescribed value YTCLKS2 is added thereto to bring it closer to the QAT value.

The program then advances to S214, in which it is checked whether the calculated value exceeds a time counter upper limit value MAX. When the result in S214 is YES, the program goes to S216, in which the time counter value is set to the upper limit value MAX. When the result is NO, S216 is skipped.

The program then advances to S218, in which it is checked whether the time counter value exceeds QAT. When the result is YES, the program goes to S220, in which the time counter value is set to QAT for the same reason explained regarding S210.

The program then advances to S222, in which it is checked whether the calculated time counter value exceeds another upper limit value YTMCMAX. When the result in YES, the program goes to S224, in which the time counter value is set to the upper limit value YTMCMAX. The upper limit value YTMCMAX represents a value equivalent to the line pressure in FIG. 2 and since the supplied oil pressure cannot exceed the line pressure, S222 and S224 are conducted to lower the calculated time counter value to or below the line pressure equivalent value YTMCMAX when it is found to exceed the same. When the result is NO in S222, S224 is skipped.

As clearly shown in the flowchart of FIG. 9, when the result of checking in either of S208 or S218 is NO, then S218 or S220 is skipped, respectively.

In the embodiment described in the foregoing, the state of the oil pressure clutch is detected before supply of response pressure and whether or not response pressure should be supplied is determined based on the result of the detection. As a result, supply of response pressure despite that, for example, the play portion of the oil pressure clutch is already charged does not occur. There is therefore no risk of this type of response pressure supply causing sudden engagement of the clutch before time T1 in the timing chart of FIG. 4 and, consequently, no risk of it causing gearshift shock.

Since the state of each oil pressure clutch is detected without use of an oil pressure sensor, moreover, no disadvantage arises regarding cost.

Although the added prescribed value YTCLKSn and the subtracted prescribed value YTCLGSn are described as being of equal value for the same gear in the foregoing, they may instead be different. Moreover, while the added prescribed value YTCLKSn and the subtracted prescribed value YTCLGSn are described as being constant values in the same gear, they may be varied with the time point at which the addition or subtraction is made.

While the invention was described with respect to a hydraulically operated transmission, it can also be applied to other types of vehicle transmissions.

Although the invention has thus been shown and described with reference to specific embodiments, it should be noted that the invention is in no way limited to the details of the described arrangements, changes and modifications may be made without departing from the scope of the invention, which is defined by the appended claims.

What is claimed is:

1. A system for controlling hydraulic pressure of a hydraulically operated vehicle transmission, comprising:

vehicle operating condition detecting means for detecting parameters indicative of operating conditions of the vehicle;

gearshift command output means for determining a gear ratio to be shifted to based on the detected parameters, to output a gearshift command;

a plurality of frictional engaging elements for selectively establishing one gear stage in the transmission; and hydraulic pressure regulating means for regulating a supply of hydraulic pressure to at least one of said frictional engaging elements in response to the gearshift command, such that the determined gear ratio is established to transmit engine power to a vehicle wheel, said hydraulic pressure regulating means regulating the supply of hydraulic pressure to the at least one of said frictional engaging elements to decrease a time lag between an output of the gearshift command and a start of engagement of the frictional engaging element;

wherein said hydraulic pressure regulating means includes:

power transmission capacity detecting means for detecting a capacity of power transmitted from an input side to an output side of the frictional engaging element; and control means for controlling operation of said hydraulic pressure regulating means in response to the detected capacity of power detected by said power transmission capacity detecting means.

2. A system according to claim 1, wherein said control means controls the operation of said hydraulic pressure regulating means to prohibit the operation if the capacity of power of the frictional engaging element is detected to be greater than a predetermined value when the frictional engaging element is engaged.

3. A system according to claim 1, wherein said control means controls the operation of said hydraulic pressure regulating means to execute the operation if the capacity of power of the frictional engaging element is detected to be smaller than a predetermined value when the frictional engaging element is engaged.

4. A system according to claim 1, wherein said hydraulic pressure regulating means regulates the supply of hydraulic pressure to the frictional engaging element such that the hydraulic pressure is high for a predetermined period after the output of the gearshift command.

5. A system according to claim 1, wherein the capacity of power detected by said power transmission capacity detecting means corresponds to the hydraulic pressure supplied to the frictional engaging element.

6. A system according to claim 1, wherein the capacity of power detected by said power transmission capacity detecting means increases at a predetermined rate when the frictional engaging element is being engaged and decreases at a prescribed rate when the frictional engaging element is being disengaged.

7. A system according to claim 6, wherein the capacity of power detected by said power transmission capacity detecting means is restricted to increase in response to the operation of said hydraulic pressure regulating means.

* * * * *